US011559895B2

(12) United States Patent
Voorhies et al.

(10) Patent No.: US 11,559,895 B2
(45) Date of Patent: *Jan. 24, 2023

(54) PREDICTIVE ROBOTIC OBSTACLE DETECTION

(71) Applicant: inVia Robotics, Inc., Westlake Village, CA (US)

(72) Inventors: Randolph Charles Voorhies, Sherman Oaks, CA (US); Brandon Pennington, Encino, CA (US); William Shane Simpson Grant, Van Nuys, CA (US); Joseph Traverso, Simi Valley, CA (US); Lior Elazary, Agoura Hills, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,425

(22) Filed: Oct. 8, 2021

(65) Prior Publication Data

US 2022/0024036 A1 Jan. 27, 2022

Related U.S. Application Data

(63) Continuation of application No. 16/508,530, filed on Jul. 11, 2019, now Pat. No. 11,192,248.

(51) Int. Cl.
*B25J 9/00* (2006.01)
*B25J 9/16* (2006.01)
(Continued)

(52) U.S. Cl.
CPC .......... *B25J 9/1666* (2013.01); *G05D 1/0214* (2013.01); *B25J 5/007* (2013.01)

(58) Field of Classification Search
CPC ....... B25J 9/1666; B25J 5/007; G05D 1/0214; G05D 1/0234; G05D 2201/0216; G06Q 10/08; G06Q 50/28
See application file for complete search history.

(56) References Cited

U.S. PATENT DOCUMENTS 10,207,868 B1 2/2019 Stubbs et al.
10,456,915 B1 10/2019 Diankov
(Continued)

*Primary Examiner* — Ian Jen
(74) *Attorney, Agent, or Firm* — Ansari Katiraei LLP; Arman Katiraei; Sadiq Ansari

(57) ABSTRACT

Provided are systems and methods by which robots predictively detect objects that may obstruct robotic tasks prior to the robots performing those tasks. For instance, a robot may receive a task, and may obtain dimensions of a task object based on a first identifier obtained with the task or with a sensor of the robot. The robot may determine a first boundary for moving the task object based on the task object dimensions and an added buffer of space that accounts for imprecise robotic operation. The robot may detect a second identifier of a neighboring object, and may obtain dimensions of the neighboring object using the second identifier. The robot may compute a second boundary of the neighboring object based on the dimensions of the neighboring object and a position of the second identifier, and may detect an obstruction based on the second boundary crossing into the first boundary.

20 Claims, 14 Drawing Sheets

(51) Int. Cl.
*G05D 1/02* (2020.01)
*B25J 5/00* (2006.01)

(56) References Cited

U.S. PATENT DOCUMENTS

| | | |
|---|---|---|
| 10,606,269 B2 | 3/2020 | Millard et al. |
| 2007/0276539 A1 | 11/2007 | Habibi et al. |
| 2019/0187703 A1 | 6/2019 | Millard et al. |
| 2019/0196480 A1 | 6/2019 | Taylor |
| 2019/0202057 A1 | 7/2019 | Smith |
| 2021/0086370 A1* | 3/2021 | Zhang .................. B25J 9/0084 |

* cited by examiner

PREDICTIVE ROBOTIC OBSTACLE DETECTION

CLAIM OF BENEFIT TO RELATED APPLICATIONS

This application is a continuation of U.S. nonprovisional application Ser. No. 16/508,530 entitled "PREDICTIVE ROBOTIC OBSTACLE DETECTION", filed Jul. 11, 2019. The contents of application Ser. No. 16/508,530 are hereby incorporated by reference.

BACKGROUND INFORMATION

Autonomous robots may be used to automate various tasks including object retrieval and object placement. However, the robots may not complete each task with exact precision every time due to some imprecision in the actuators and sensors of the robots. However slight the imprecision may be, any imprecise operation or unexpected positioning of objects needed to perform a task can cause subsequent operations of the robots to fail, or may cause the robots to spend time and resources detecting and/or correcting for the deviations.

Some sites may use storage shelving with fixed slots or spaces to assist the robots in completing these and other tasks that involve movement of objects to and from the storage shelving. For instance, each fixed slot may have upward extending sidewalls to ensure that only one object is placed between the sidewalls, and to ensure that neighboring objects are separated by at least one sidewall. The sidewalls prevent neighboring objects from obstructing the retrieval or placement of a particular object by ensuring that the neighboring object do not overlap or intrude into the space of the particular object. The fixed slots or spaces can also correct for imprecise actions of the robot by guiding placement of an object into the correct slot or space, and can prevent object retrieval or placement from displacing neighboring objects.

Storage shelving with fixed slots or spaces are specialized equipment that increase cost within a site. Storage shelving with fixed slots or spaces may also limit the usage of the shelving since the spacing of each slot or space cannot be dynamically adjusted for objects of different dimensions. For instance, some objects may have larger dimensions than other objects, and may therefore not fit into certain slots. Alternatively, the spacing between the fixed slots may be too big for smaller objects, thereby leading to wasted or unused shelf space.

Without the fixed slots or spaces, the object retrieval and placement operations may be affected by the imprecise operation of the robot actuators and sensors. For instance, a first object may collide with or otherwise impact a neighboring second object when a robot attempts to retrieve or place the first object using imprecise operations. The impact may damage the first object. Alternatively, the impact may displace the first object and/or cause the robot to lose engagement with the first object, each of which can damage the first object. The impact may also displace, shift, or otherwise move the second object. As a result, the second object may be damaged, may create an obstacle that prevents other robots from engaging the second object, or may move the second object from an expected location that robots use to locate the second object.

DETAILED DESCRIPTION OF PREFERRED EMBODIMENTS

Figure 1:
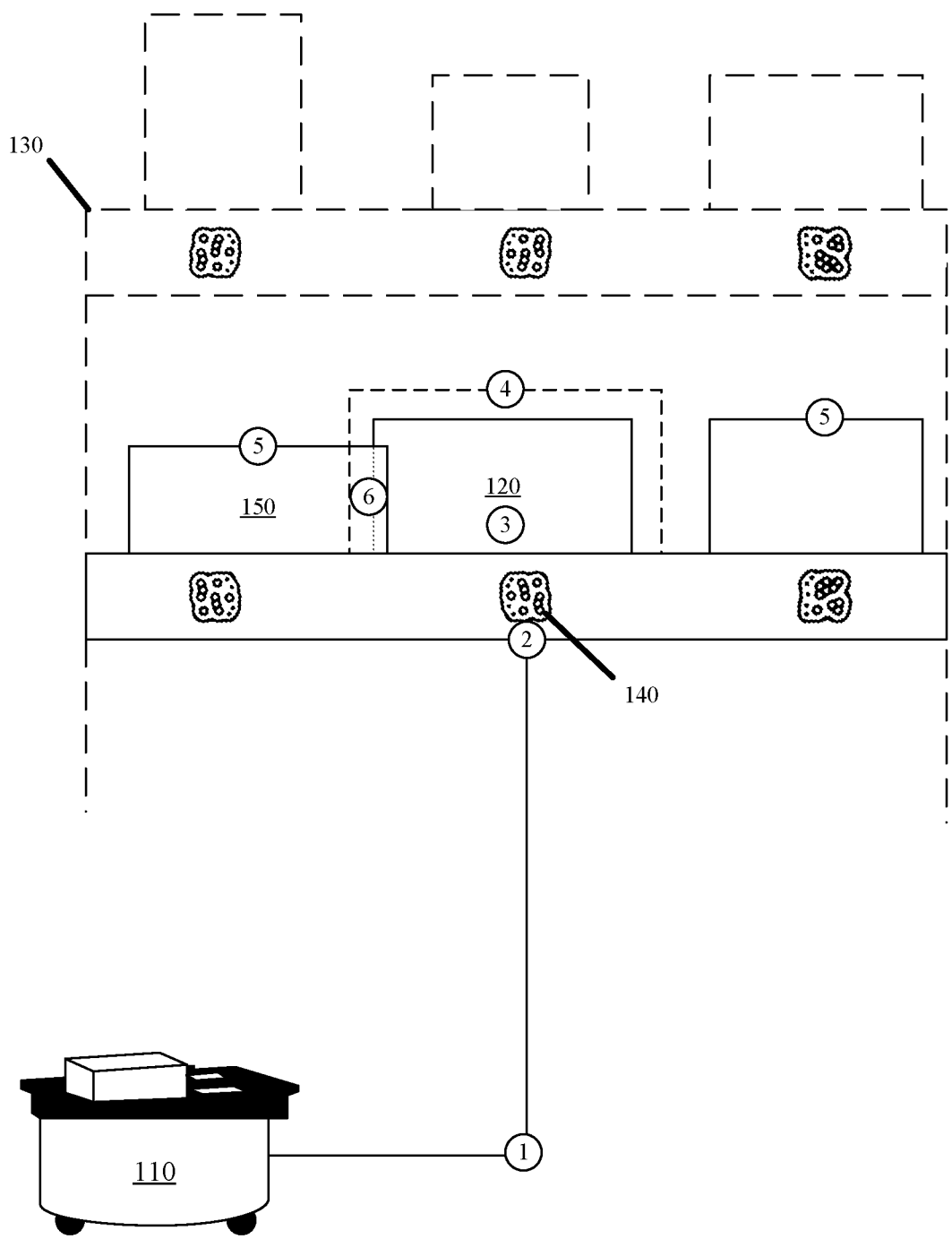
FIG. 1 illustrates an example of a robot predictively detecting an obstruction prior to performing an object retrieval task in accordance with some embodiments described herein.

The following detailed description refers to the accompanying drawings. The same reference numbers in different drawings may identify the same or similar elements.

Disclosed are systems and methods by which autonomous robots may predictively detect misaligned objects that may obstruct retrieval, placement, or other tasks prior to the robots performing those tasks. The robots may preemptively adjust operations of a task affected by a predicted obstruction, rather than continue with the task until physically encountering the obstruction and changing operations once the obstruction occurs. In other words, the robots may preemptively determine if they can safely complete a placement, retrieval, or other task within specified tolerances without impacting other nearby objects before performing operations in furtherance of the task. An obstruction may therefore include any physical object that is in a path or otherwise partially blocks the ability of a robot to execute one or more operations in furtherance of a task.

The predictive obstruction detection allows the robots to safely complete tasks using imprecise robotic operations without specialized equipment that otherwise compensates for the imprecise robotic operations (e.g., shelving with fixed slots). For instance, the predictive obstruction detection allows the robots to safely engage and/or otherwise interact with objects that are stored on shelving, racks, and/or other equipment without fixed slots, fixed spaces, or physical barriers, partitions, or separators that prevent obstructions. The robots can engage and/or interact with these objects without damaging the objects despite the objects being freely, loosely, and imprecisely organized adjacent to one another.

Accordingly, robots, that lack exact precision during task and/or operation execution, can be used to manipulate freely, loosely, and imprecisely organized objects, including objects that have shifted as a result of interactions robots and/or other actors (e.g., human workers) have with the objects over time, without specialized or restrictive storage equipment and without concern of the imprecise operations damaging the objects or further displacing the objects. Stated differently, the robots can use the predictive detection to accommodate or adjust to a previous set of imprecisely executed operations so long as the resulting deviations are within acceptable tolerances. The acceptable tolerances are accounted for as part of the predictive detection to ensure that further imprecise operations of the robot in completion of a task will not be impacted by the prior deviations, and that there is no likelihood of damaging targeted or neighboring objects as a result of further imprecise operations executed by the robot to complete a task. In other words, the acceptable tolerances provide a buffer to allow for further imprecise operations without the possibility of a conflict or collision with neighboring objects.

In response to predicting an obstruction that obstructs performance of a task, a robot may autonomously attempt to correct the obstruction before commencing execution of the task, and may commence execution of the task if the correction is successful. Otherwise, the robot may abort the task, and/or provide an alert to notify other robots or entities about the obstruction.

Object and/or collision detection can be a complex and computationally intensive operation when based off image analysis. For instance, analyzing an image or scene to determine the different boundaries of two overlapping objects in three-dimensional space may be simple for a human, but can take several seconds and/or consume a large amount of processor cycles when performed by a robot. Moreover, the image analysis may only detect if one object obstructs another. The image analysis does not predict whether imprecise operation of a robot can bring about a collision between objects that are not otherwise obstructing one another.

Accordingly, the embodiments set forth herein provide optimized systems and methods for efficiently predicting obstructions without intensively identifying every object in three-dimensional space via computationally expensive image analysis. Some embodiments rely on a single object and/or location identifier, that is easily and quickly detected with one or more sensors of a robot, to derive the positioning of different objects and to determine whether the computed positions obstruct performance of retrieval, placement, and/or other tasks performed by the robots when accounting for imprecise operations of the robots.

FIG. 1 illustrates an example of robot 110 predictively detecting an obstruction prior to performing an object retrieval task in accordance with some embodiments described herein. The object retrieval task involves robot 110 retrieving object 120 from storage rack 130, wherein storage rack 130 may be one of several storage racks in a site or warehouse in which robot 110 and other robots perform different tasks.

In response to receiving the object retrieval task, robot 110 may move (at 1) to storage rack 130 using one or more actuators and sensors. Robot 110 may then position itself before the expected location of object 120 by using identifier 140 on storage rack 130, or other landmark on or around storage rack 130, as a reference point for the expected location.

Storage rack 130 may have different identifiers to demarcate different spaces or slots that can be used to store different objects. Each identifier, including identifier 140, may be a fiducial, Quick Response ("QR") code, barcode, marker, salient queue, or other visual feature that can be detected using a camera or other sensor of robot 110. For instance, robot 110 may use one or more sensors to scan (at 2) identifier 140, and determine from the scan and/or identifier 140 that robot 110 has arrived at the expected location of object 120 (e.g., the storage location where object 120 was last placed). In some embodiments, the object retrieval task may provide robot 110 with identifier 140, and robot 110 can identify the expected location for object 120 by matching identifier 140 from the received object retrieval task to identifier 140 on storage rack 130. Accordingly, robot 110 may use identifier 140 and/or other data included with the object retrieval task to move to storage rack 130 from a prior position and to identify the expected location for object 120.

Once at the expected location of object 120, robot 110 may perform the predictive obstruction detection prior to retrieving object 120 in furtherance of the assigned object retrieval task. The predictive obstruction detection may include robot 110 using one or more sensors to detect (at 3) object 120 relative to the expected location (i.e., determined via identifier 140). In some embodiments, object 120 may include a different identifier or visual feature by which robot 110 can detect object 120. Robot 110 may detect object 120 separate from detecting the expected location of object 120, because object 120 may be imprecisely placed at the expected location, or because object 120 may have shifted from the expected location due to prior interactions that humans or robots have with object 120 or other neighboring objects.

In some embodiments, robot 110 does not expend resources attempting to visually identify the boundaries or edges of object 120. Instead, robot 110 may detect (at 3) a single identifier or feature of object 120, and from the detected identifier or feature, robot 110 may derive the actual position of object 120 by computing the boundaries or edges relative to the single identifier or feature of object 120 as is described in detail further below. In some embodiments, robot 110 may compute the boundaries or edges for a front face of object 120 or for the entire three-dimensional volume of object 120.

Robot 110 may compute (at 4) retrieval tolerances for safe retrieval of object 120 based on the actual position of object 120, dimensions of object 120, and/or possible imprecision in the retrieval operation performed by robot 110 as determined from prior retrieval operations of robot 110. The retrieval tolerances may specify a buffer or space around object 120 that compensates for a possible amount of deviation that may or may not occur as a result of imprecise operation of the one or more actuators and/or sensors that robot 110 uses for object retrieval.

For instance, robot 110 may not perform an on-center and straight retrieval of object 120 every time. Robot 110 may sometimes engage object 120 a couple degrees off-center with a retrieval actuator, such that when robot 110 pulls object 120 off storage rack 130, object 120 may shift laterally or may be rotated by some degree during retrieval. The retrieval tolerances account for the possibility of these shifts, rotations, and other deviations occurring, and provides a buffer to allow for these deviations to occur without impacting other neighboring objects, provided that no obstruction is predictively detected to fall within the space defined by the retrieval tolerances.

Figure 2:
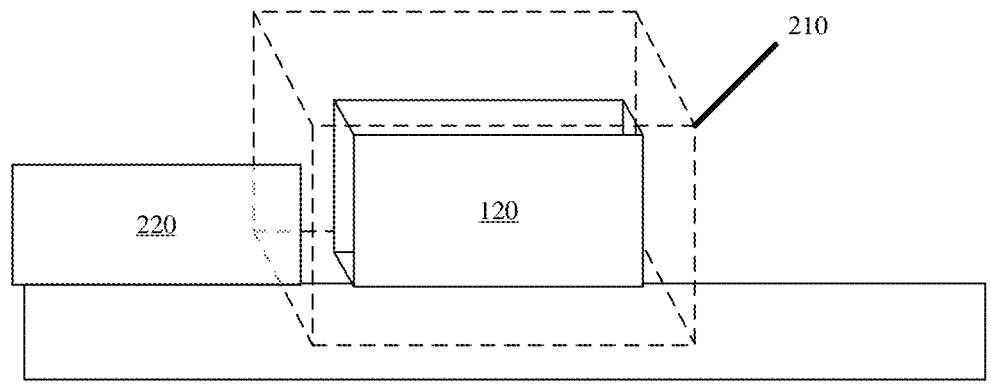
FIG. 2 conceptually illustrates object retrieval tolerances that may be computed by a robot in order to perform the predictive obstacle detection in accordance with some embodiments presented herein.
Figure 2:
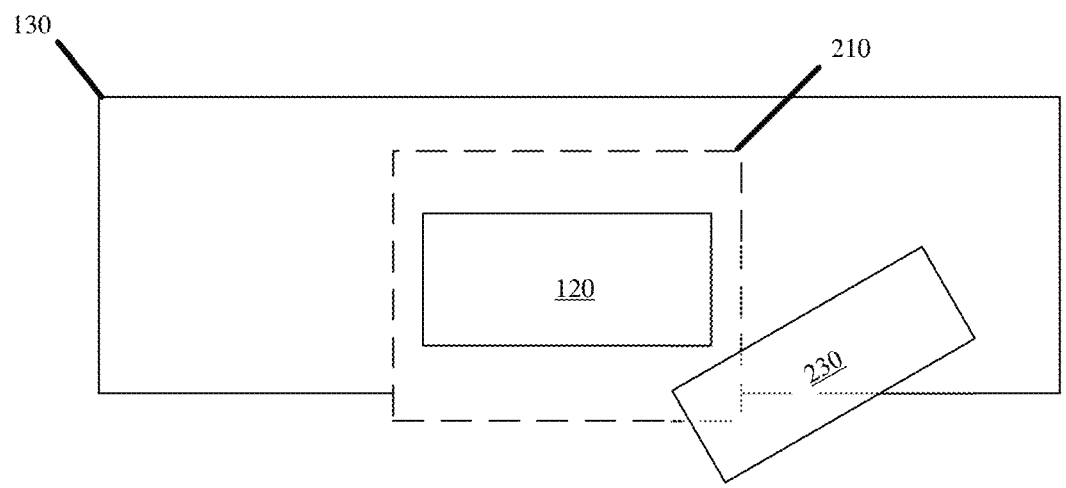

FIG. 2 conceptually illustrates retrieval tolerances 210 for object 120 that may be computed by robot 110 in order to perform the predictive obstacle detection in accordance with some embodiments presented herein. In particular, FIG. 2 illustrates retrieval tolerances 210 from a top view of object 120, and from a front perspective view of object 120.

Robot 110 may compute retrieval tolerances 210 starting from a single identifier or feature of object 120. As will be described below, robot 110 may compute the edges or boundaries of object 120 based on the single identifier or feature, and may then extend from the computed edges or boundaries to define retrieval tolerances 210.

Retrieval tolerances 210 may include a three-dimensional volume that extends around object 120. In particular, retrieval tolerances 210 may include a computed space that provides a buffer to the sides of object 120, in front and behind object 120, and/or above or below object 120.

From this three-dimensional volume, robot 110 may predictively detect if another object obstructs the retrieval of object 120 from one side (e.g., object 220), from the front (e.g., object 230), from below, or from above. To perform the predictive detection based on the computed retrieval tolerances for object 120, robot detects whether any neighboring objects fall within retrieval tolerances. With reference back to FIG. 1, robot 110 may determine (at 5) boundaries of the objects that neighbor or are closest to object 120 at the expected location defined by identifier 130 or the actual position of object 120. In some embodiments, robot 110 may compute the boundaries of a neighboring object based on a center or other single reference point of the neighboring object, obtaining the dimensions of that neighboring object, and calculating the boundaries based on the dimensions relative to a position of the reference point.

Robot 110 may compare the neighboring object boundaries to the retrieval tolerances defined for safe retrieval of object 120. In particular, robot 110 may compare the spatial coordinates that were computed or derived for the neighboring object boundaries against the spatial coordinates that were computed or derived for the retrieval tolerances, wherein the spatial coordinates may be defined according to a current position of robot 110.

Robot 110 may determine (at 6) that a boundary of neighboring object 150 is within the space defined for the retrieval tolerances. Consequently, robot 110 may predict that neighboring object 150 can be an obstruction during retrieval of object 120 when accounting for the possibility that object 120 may shift, rotate, or otherwise deviate from a straight retrieval because of imprecision operation of robot 110.

In some embodiments, robot 110 may delay or abort the retrieval of object 120 (e.g., the assigned retrieval task) until the obstruction is remedied. In other words, robot 110 does not initiate the retrieval of object 120 only to stop the retrieval upon physically encountering the obstruction as a result of object 120 colliding with neighboring object 150.

In response to the predictive obstruction detection, robot 110 may take preemptive action to remedy the obstruction with neighboring object 150 before attempting retrieval of object 120, or robot 110 may abort the retrieval so that there is no damage to objects 120 and 150 as a result of a collision. In either case, the predictive obstruction detection prevents other obstructions from being created if robot 110 was to impact the positioning of neighboring object 150 when retrieving object 120.

Figure 3:
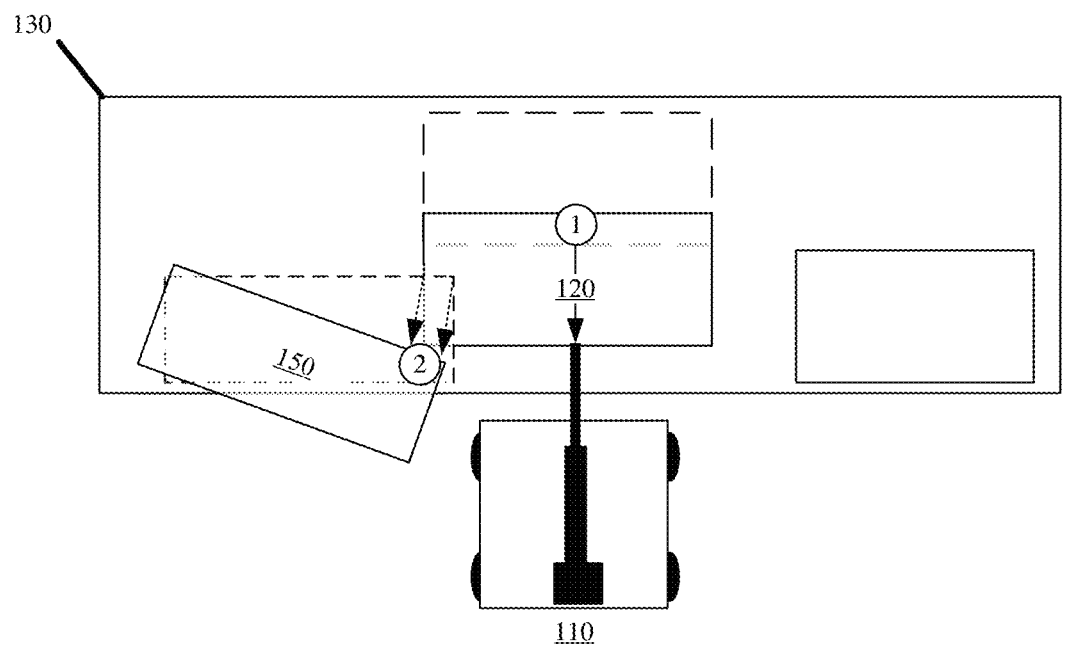
FIG. 3 illustrates an example of issues that may arise in performing robotic object retrieval without predictive obstruction detection.

FIG. 3 illustrates an example of issues that may arise in performing robotic object retrieval without predictive obstruction detection. FIG. 3 presents a top view illustration for the arrangement of objects on the shelf of storage rack 130 where object 120 is located.

As shown in FIG. 3, robot 110 may engage object 120 using a retriever, and may pull (at 1) object 120 off storage rack 130 towards robot 110. In so doing, object 120 may collide with object 150 as a result of object 150 obstructing the retrieval of object 120. In this illustration, during the retrieval, object 120 may collide with object 150 from a side and/or back of object 150.

The collision may shift (at 2) or rotate object 150 further away from its expected location, thereby making subsequent detection and/or retrieval of object 150 more difficult. The shifting of object 150 may cause other objects that are next to object 150 to also shift away from their expected locations. The collision may also damage object 120 or object 150. For instance, object 150 may fall off the front of storage rack 130 as a result of the shifting. The fall may also create a new obstruction in front of storage rack 130 that prevents other robots from moving in front of storage rack 130. Therefore, without the predictive obstruction detection illustrated in FIG. 1, object retrieval by robot 110 may cause damage to one or more objects, and/or may create one or more other obstructions that prevent other objects from being safely retrieved.

In some embodiments, robot 110 may also use the predictive obstruction detection for object placement and other tasks besides object retrieval. Whereas object retrieval involves pulling an object from a storage location, object placement involves robot 110 transferring an object to a storage location.

Figure 4:
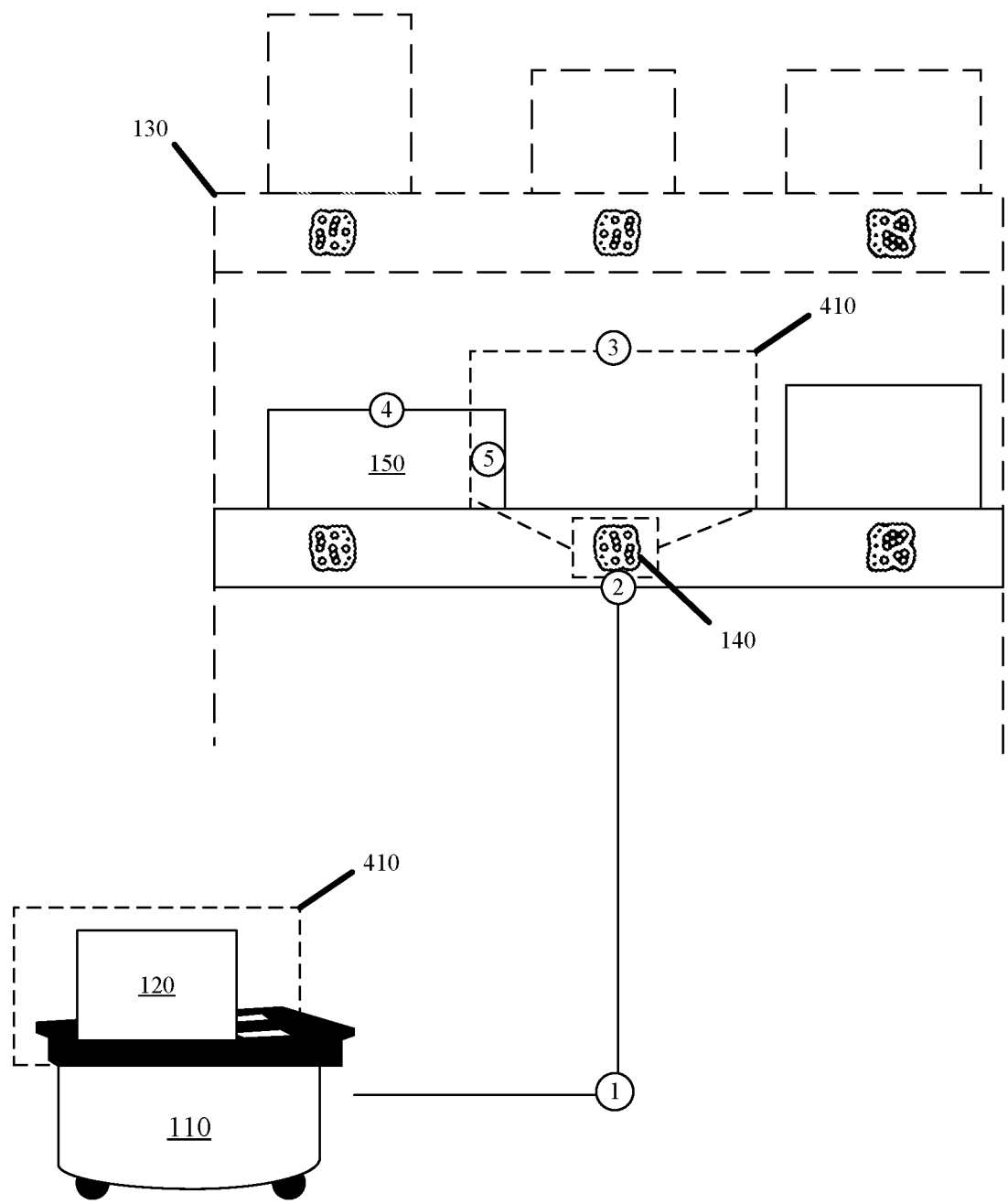
FIG. 4 illustrates an example of a robot predictively detecting an obstruction prior to performing an object placement task in accordance with some embodiments described herein.

FIG. 4 illustrates an example of robot 110 predictively detecting an obstruction prior to performing an object placement task in accordance with some embodiments described herein. In FIG. 4, robot 110 is assigned a task to place object 120 at a particular space on storage rack 130.

Robot 110 may use actuators and sensors to move (at 1) towards storage rack 130, and may scan (at 2) identifiers or other points of reference about storage rack 130 until detecting identifier 140 that identifies an expected location of object 120. In some embodiments, the object placement task may provide identifier 140 to robot 110 and/or other information that robot 110 may use to navigate to and find the expected location of object 120. Robot 110 may align its positioning with the position of identifier 140.

Robot 110 may compute (at 3) placement tolerances 410 to safely place object 120 at the expected location without obstruction while accounting for imprecise operations of robot 110. Placement tolerances 410, like the retrieval tolerances, may be based on the dimensions of object 120, and may provide additional space around object 120 as a buffer to account for imprecise placement of object 120 by robot 110 based on variability or deviations inherent in the operation of the robot actuators and/or sensors. For instance, robot 110 may not place object 120 exactly in the particular space that is allotted for object 120 because of imprecise positioning of robot 110 before identifier 140, or because of imprecise actuator movements or sensor detection.

Placement tolerances 410, or the additional buffer around object 120, may be derived or computed based on the accuracy of prior operations performed by robot 110 and/or other robots performing similar tasks. Placement tolerances 410, like the retrieval tolerances, may include a three-dimensional volume that provides additional space to the sides, front and back, and/or top and bottom of object 120.

Robot 110 may scan for objects that are located nearest the particular space where object 120 is to be stored. In response to detecting object 150, robot 110 may determine (at 4) the boundaries of object 150 based on obtained dimensions of object 150 and at least one reference point that robot 110 uses to detect object 150.

Robot 110 may determine (at 5) that a boundary of object 150 is within the space defined for the placement tolerances. Consequently, robot 110 predicts object 150 to be an obstruction that may impact the placement of object 120 in the particular space, and robot 110 may delay or abort the placement of object 120 until the obstruction is remedied. In other words, robot 110 does not initiate the placement of object 120 only to stop the placement upon making contact with the obstruction. Once again, the predictive detection allows robot 110 to take preemptive action to remedy the obstruction before attempting to place object 120, or to abort the placement so that there is no damage to the objects.

Figure 5:
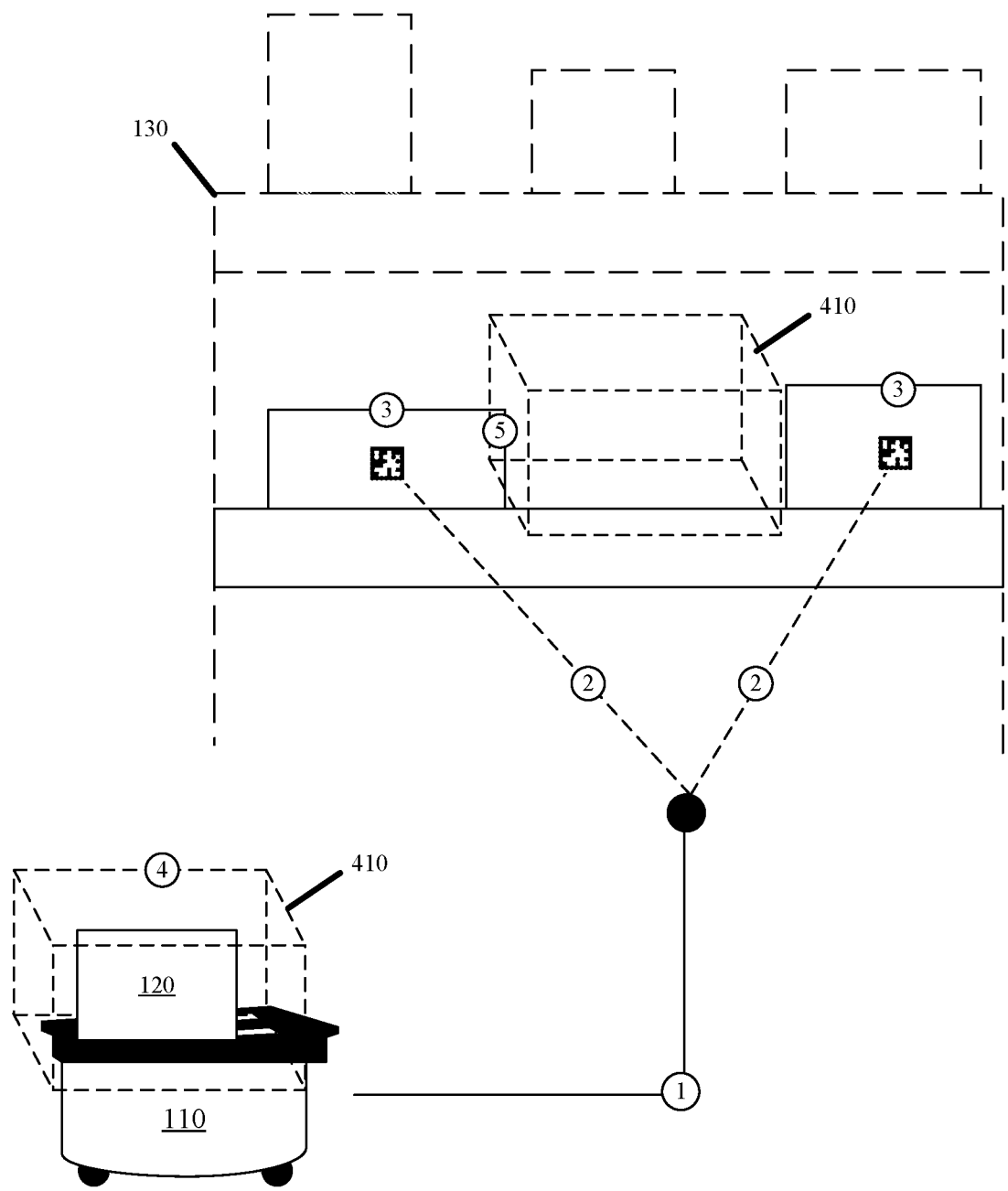
FIG. 5 illustrates an alternate methodology by which the robot may predictively detect an obstruction prior to performing an object placement task in accordance with some embodiments described herein.

FIG. 5 illustrates an alternate methodology by which robot 110 may predictively detect an obstruction prior to performing an object placement task in accordance with some embodiments described herein. Robot 110 may perform the predictive obstacle detection of FIG. 5 for an object placement task when storage rack 130 or the site lacks any identifiers or points of reference from which robot 110 can identify the expected storage location for object 120. In this case, robot 110 may move (at 1) to a location of storage rack 130, and may detect (at 2) objects present on storage rack 130 based on a single identifier or feature of the objects. Robot 110 may compute (at 3) the boundaries of the stored objects based on the single identifier or feature and/or information that is obtained about the dimensions of the stored objects.

Robot 110 may also compute (at 4) placement tolerances 410 of object 120 being carried by robot 110. Robot 110 may compute (at 4) placement tolerances 410 of object 120 based on known dimensions of object 120.

Robot 110 may then determine (at 5) that the distance separating the stored objects on storage rack 130 is less than the space computed for placement tolerances 410. Accordingly, robot 110 may detect insufficient space to safely place object 120 at the expected location using imprecise operations of robot 110.

Robot 110 may remedy the obstruction by moving one of the stored objects on storage rack 130 such that the available space between the objects increases to at least equal placement tolerances 410. In some embodiments, may abort the placement operation in response to the detected obstruction, or may continue scanning storage rack 130 for other empty spaces equal to or greater than placement tolerances 410.

In some embodiments, robot 110 may use wheel encoder information or other positional information to move (at 1) to an expected location for storing object 120 on storage rack 130. In some other embodiments, robot 110 may detect all objects stored on storage rack 130 in order to determine if there is sufficient available space that meets placement tolerances 410.

Figure 6:
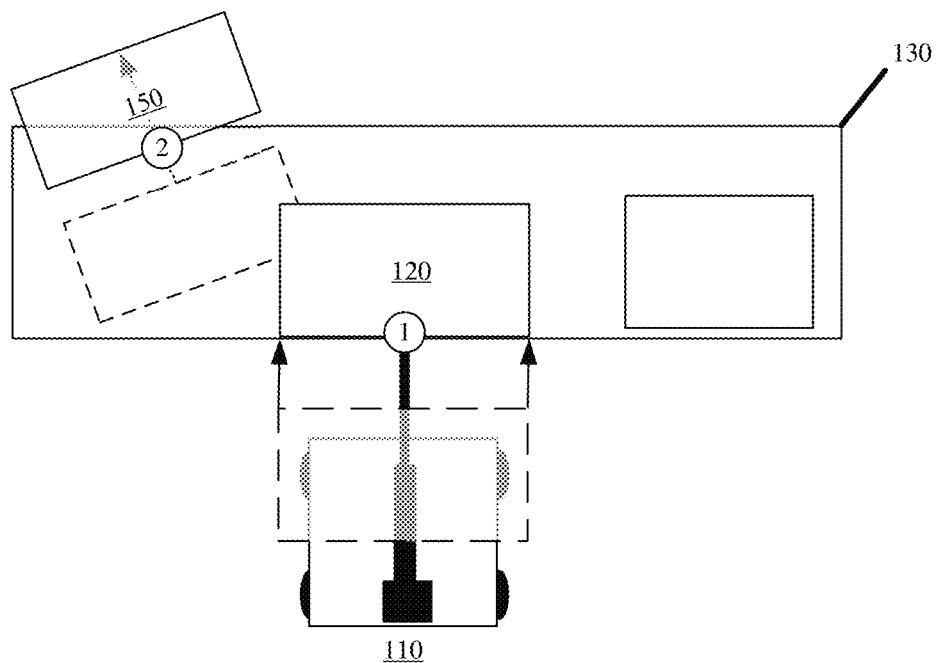
FIG. 6 illustrates an example of issues that may arise in performing robotic object placement without predictive obstruction detection.

FIG. 6 illustrates an example of issues that may arise in performing robotic object placement without predictive obstruction detection. FIG. 6 presents a top view illustration for the arrangement of objects on the shelf of storage rack 130 where robot 110 is to place object 120.

As shown in FIG. 6, robot 110 may transfer (at 1) object 120 off a platform of robot 110 and onto the particular space designated for object 120 on storage rack 130. As object 120 is pushed onto storage rack 130, object 120 comes into contact with neighboring object 150 either because object 150 is misplaced or has shifted from an expected location, or because robot 110 imprecisely places object 120 with some deviation from the particular space that is designated for object 120 on storage rack 130.

The collision resulting from the obstruction caused by object 150 may shift (at 2) or rotate object 150 from its current location. As a result of shifting (at 2) object 150, the position of other objects on storage rack 130 may be affected, creating a cascade of obstructions for subsequent robotic interactions with those affected objects. Similarly, the collision may damage one or more of objects 120 and 150. A worst-case scenario may include robot 110 placing object 120 onto storage rack 130 without detecting the collision with object 150, and object 150 being pushed off an open back side of storage rack 130 as a result of the placement of object 120 onto storage rack 130. Object 150 may be damaged by the fall, and may also create numerous other issues ranging from other robots being unable to locate object 150 anywhere on storage rack 130 (thereby preventing retrieval tasks involving object 150), and object 150 creating obstructions that prevent or hinder robotic movement while on the ground about the back side of storage rack 130.

In some embodiments, robot 110 may compute different tolerances for retrieval and/or placement. For instance, robot 110 may perform retrieval tasks with less variance than when performing placement tasks. Accordingly, placement tolerances 410 may provide a larger buffer than retrieval tolerances 210. In some embodiments, robot 110 may perform the predictive obstacle detection to ensure that a particular object can be retrieved and reinserted in the same location without issue. In some such embodiments, robot 110 may compute both retrieval tolerances 210 and placement tolerances 410, or the larger of the two, when performing either a retrieval task or a placement task.

Figure 7:
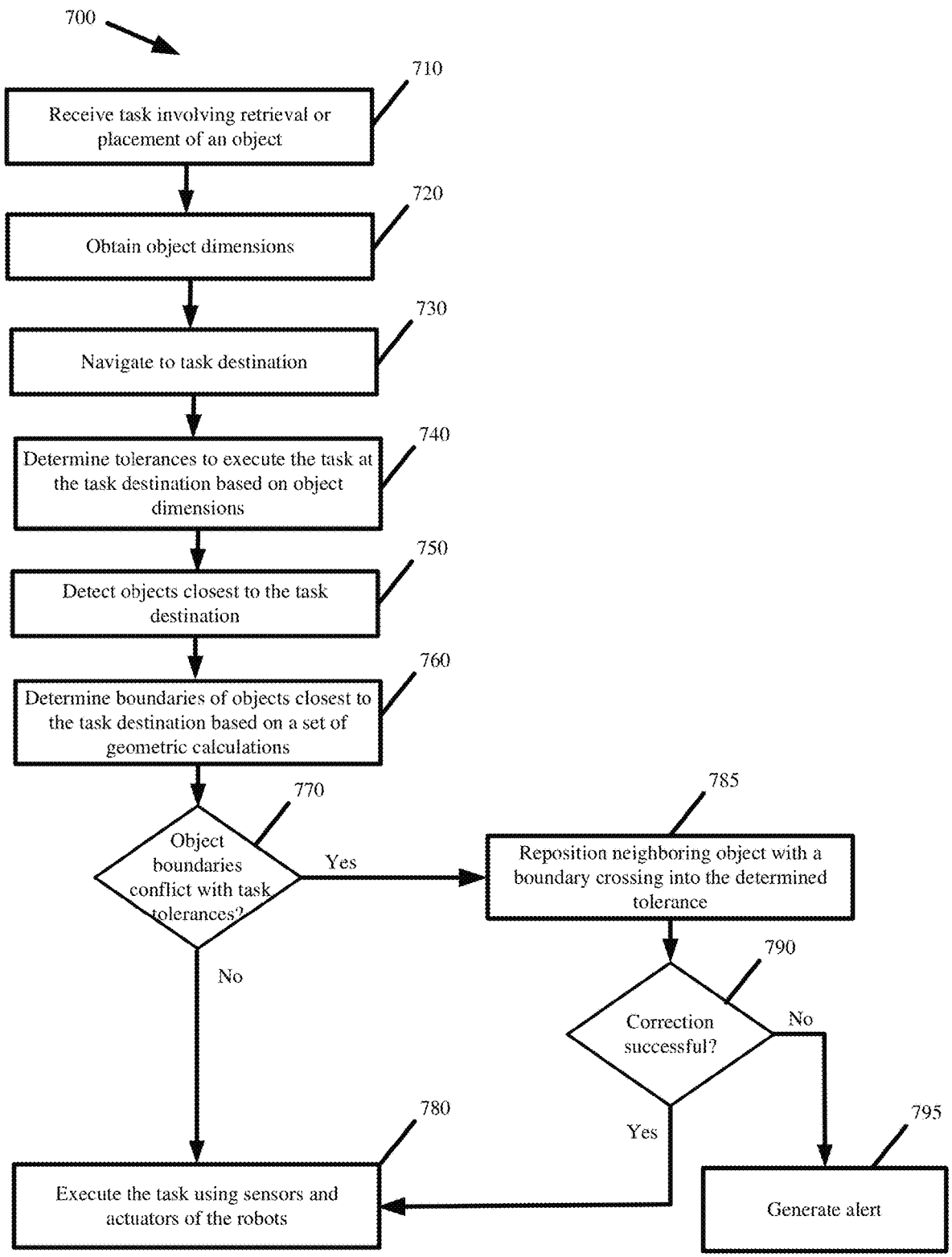
FIG. 7 presents a process for efficiently predicting obstructions using one or more sensors of a robot in accordance with some embodiments presented herein.

FIG. 7 presents a process 700 for efficiently predicting obstructions using one or more sensors of robot 110 in accordance with some embodiments presented herein. Process 700 may be performed by robot 110 and/or other robots operating in a site. The robots may be used to autonomously perform retrieval, placement, and other tasks in the site alongside or independent of human workers and other machinery or devices.

Process 700 may include receiving (at 710) a task at robot 110. The task may specify performing a retrieval, placement, and/or other task at a destination location. The task may further specify at least one object involved as part of the task.

Robot 110 may receive the task via a wireless radio and wireless messaging passed over a wireless network. For instance, robot 110 may include a WiFi network radio, and may receive one or more HyperText Transfer Protocol ("HTTP") messages that are addressed to an Internet Protocol ("IP") address used by robot 110 for wireless communications.

The HTTP messages may include commands or instructions defining the task that robot 110 is to perform. In some embodiments, the HTTP messages may include commands that directly control operation of robot 110. In some embodiments, the HTTP messages may provide identifiers, or values that are decoded from the identifiers. The identifiers may identify the destination location and/or objects that robot 110 is to interact with at the destination location. Specifically, the task identifiers may match to fiducials, barcodes, visual identifiers, visual features, and/or salient queues that are found at the destination location, on objects, pathways leading to the destination location, and/or other resources that robot 110 may use to execute a task. Robot 110 may use the task identifiers to identify the resources it needs to execute the task, to verify its location or placement, and/or to verify whether robot 110 is correctly executing the assigned task.

Process 700 may include obtaining (at 720) dimensions of the task object. The dimensions may specify the height, length, depth, weight, shape, and/or other characteristics of the object. The other characteristics may be unrelated to the dimensions of the object, and may aid robot 110 in object detection. For instance, the characteristics may include visual features or markings that can be used to identify the object. The dimensions of each object may be tracked in a database that can be accessed by the robots, or may be stored in memory or storage of each robot. When stored in the database, the dimensions of the task object may be retrieved by a task coordinator and forwarded to robot 110 as part of assigning the task to robot 110. Alternatively, robot 110 may receive (at 710) the task, determine that the task involves a particular object that is uniquely identified via an identifier or other value, and may query the database for the dimensions of the particular object using the identifier and a wireless network. In some embodiments, robot 110 may also obtain dimensions, characteristics, and/or other information about the destination and/or other resources that robot 110 may use during execution of the assigned task.

Process 700 may include navigating (at 730) robot 110 to the task destination. For instance, in response to receiving (at 710) the task, robot 110 may determine the task destination, may determine its current location, and may plot an efficient path to move from its current location to the task destination based on a map of the site defining accessible pathways that robot 110 can traverse. Robot 110 may then activate one or more drive motors or other actuators to physically move to the task destination according to the plotted path. In some embodiments, the received task may specify the path that takes robot 110 from its current position to the task destination, and may further include the commands to control the actuators of robot 110 to follow the specified path.

Robot 110 may scan a set of identifiers distributed about the plotted path to the task destination to verify that it is moving in the correct direction. In some embodiments, robot 110 may receive beaconing information that are wirelessly transmitted from different beacons distributed about the plotted path to verify that it is moving in the correct direction. In still some embodiments, robot 110 may use various onboard sensors to track its current position and movement to the task destination. For instance, robot 110 may include one or more wheel encoders at each wheel of robot 110. The wheel encoders accurately detect distance and direction of robot 110 based on rotations of the different wheels, and can thereby track where robot 110 is in a given site.

In some embodiments, navigating (at 730) to the path destination may include verifying that robot 110 arrives at the correct destination with a specific orientation. For instance, the received task may provide an identifier that can be found at the task destination. Once robot 110 arrives at the task destination, it may use its sensors (e.g., camera, scanner, etc.) to locate the identifier, and may adjust its positioning relative to the identifier. For instance, robot 110 may use a camera to detect the identifier, and may reposition itself so that the identifier appears in the camera at a specified size, that is indicative of a specific distance from the identifier, and at a specified orientation, that is indicative of robot 110 being oriented correctly relative to the identifier. In this manner, robot 110 may arrive at a desired position and orientation with a high degree of precision, although there is a chance that robot 110 may be offset from the desired position and/or orientation by some amount (e.g., one or more inches or degrees) as a result of some imprecision in the robot's movements and/or sensing of the identifier. For instance, the drive motor of robot 110 and the sensor(s) used to detect the robot's position may collectively bring robot 110 within at least 6 inches of its desired destination.

Navigating (at 730) to the task destination may include moving about a ground surface or different levels in a site. Navigating (at 730) to the task destination may further include adjusting a height of robot 110. For instance, the task destination may specify a position before a particular storage rack with multiple shelves at different heights, and a particular shelf of the particular storage rack. Accordingly, robot 110 may arrive before the particular storage rack using one or more drive motors. Robot 110 may then activate a lift or other actuator to raise a platform of robot 110 to the height of the particular shelf, wherein each shelf of the particular storage rack may be uniquely identified with one or more identifiers. In some embodiments, robot 110 may be an aerial drone. In any case, navigating (at 730) to the task destination may involve moving robot 110 about three dimensions or planes, and bringing robot 110 to a particular location in three-dimensional space with a correct orientation.

Process 700 may include determining (at 740) tolerances for executing the task at the task destination. The tolerances may be derived from the dimensions of the task object, and may account for known or expected imprecise operations of robot 110. The tolerances may provide robot 110 with sufficient space to execute the task without impacting neighboring objects using the known or expected imprecise operations. For instance, the robot's position may be offset by up to three inches from the exact location of the task destination, and the robot's actuators may retrieve or place an object within two inches of an expected space. Accordingly, robot 110 may determine that five inches of tolerance should be added to each dimension (e.g., height, width, and/or depth) of the task object in order safely retrieve or place the object.

Robot 110 may obtain the dimensions for one or more objects implicated as part of the task upon receiving (at 710) the task from a robot coordinator or other device. In other words, the task may include height, length, and width dimensions for the one or more task objects. In some embodiments, robot 110 may query a remote database for the task dimensions using wireless connectivity and an object identifier. The object identifier may be provided with the task that is received (at 710) by robot 110, or may be obtained by robot 110 as a result of locating the task object and scanning the object identifier somewhere on the task object. The object identifier may include a fiducial, marker, or other visual feature that can be used to identify the object and/or query the remote database for more information about the object.

In some embodiments, the object dimensions may be specified relative to a position of the object identifier or other single point of reference from which robot 110 can detect the object. For instance, when the object identifier is at a center of a front face of the object, the obtained object dimensions may specify distances from the object center to each edge or boundary of the object. Similarly, if the object identifier is found at a front bottom left corner, the obtained object dimensions may specify distances from the front bottom left corner to each other edge or boundary of the object.

In some embodiments, robot 110 may define the tolerances according to coordinates or other geolocation data used by robot 110 to track its location or the task destination. In some such embodiments, the tolerances may be defined with a set of actual coordinates that correspond to specific positions within a site. In some other embodiments, the tolerances may be defined with a set of relative coordinators that are based off a current position of robot 110.

Figure 8:
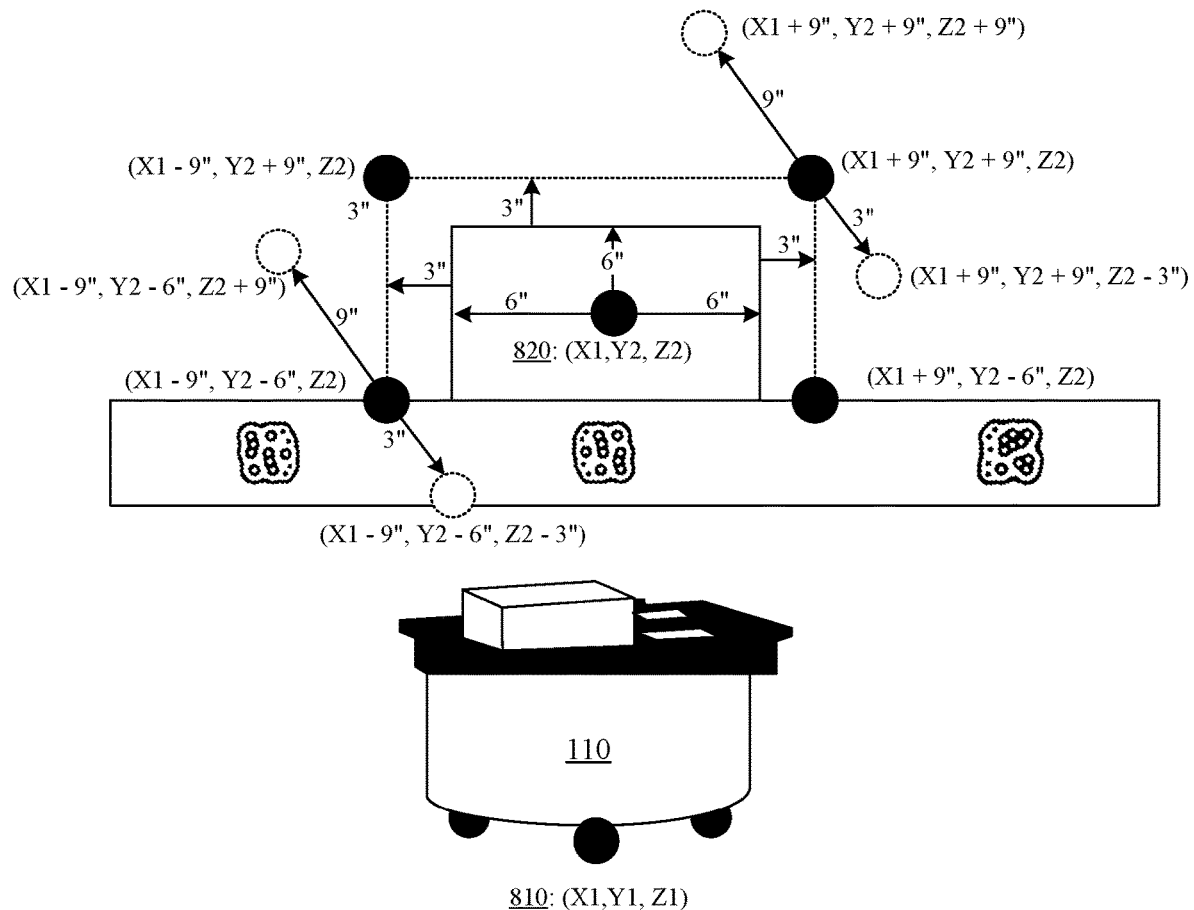
FIG. 8 illustrates an example of defining tolerances for a task according to coordinates for the current position of a robot in accordance with some embodiments.

FIG. 8 illustrates an example of defining tolerances for a task according to coordinates for the current position of robot 110 in accordance with some embodiments. As shown in FIG. 8, robot 110 determines that it is located at first x, y, and z coordinate 810, and further determines that the center point of a task object associated with the task is located at second x, y, and z coordinate 820 that is some distance in front and above of robot 110.

Robot 110 may determine the center point of the task object by scanning an object identifier that is specifically placed at the center point, and may obtain the dimensions of the task object by querying an object database using the object identifier. In this figure, the task object may be 12 inches on all sides.

In some embodiments, the object identifier may be located elsewhere on the object. In this case, robot 110 may query the database with the object identifier, and the query results may identify the specific placement of the object identifier about the object, and/or provide dimensions of the task object that are defined relative to the placement of the object identifier.

With reference back to FIG. 8, robot 110 may also determine that 3 inches of tolerance is needed to safely complete the task based on prior measured deviations of the robot's 110 actuators and/or sensors for manipulating the task object as per the assigned task. Accordingly, robot 110 defines the top tolerances to be 9 inches from second x, y, and z coordinates 820, the side tolerances to be 9 inches horizontally from the second x, y, and z coordinates 820, the back tolerances to be 9 inches from the second x, y, and z coordinates 820, the front tolerances to be 3 inches from the second x, y, and z coordinates 820, since the determined center point corresponding to second x, y, and z coordinates 820 may be located about a front face of the object, and the bottom tolerances to be 3 inches below the second x, y, and z coordinates 820, since the task object rests above a solid surface that can be impacted by robot 110. The tolerances specify sufficient vertical and horizontal distances needed for robot 110 to safely retrieve the task object without a likelihood of impacting other neighboring objects.

With reference back to FIG. 7, process 700 may include detecting (at 750) the objects that are closest to the task destination and/or task object. Robot 110 may simplify the detection (at 750) by detecting the presence of an object using an identifier or visual feature of the object, rather than by processing one or more images or signaling to differentiate the objects closest to the task destination from other objects (e.g., the task object). For instance, each object at the task destination may include a fiducial, marker, QR code, barcode, or other identifier that uniquely identifies the object and differentiates the object from other objects. Each object may alternatively have a distinct visual feature that robot 110 can readily detect without extensive processing to differentiate one object from another object.

In response to detecting (at 750) a neighboring object via an identifier of that object, process 700 may include determining (at 760) the boundaries of that object without extensive computational image analysis. In some embodiments, robot 110 may determine (at 760) the boundaries of the neighboring object by querying a database using the identifier of the object, and obtaining dimensions of the object and/or the object dimensions relative to a position of the identifier about the object (e.g., centered or placed elsewhere on a surface of the object) as a result of the query. Robot 110 may then perform a set of geometric calculations to locate the boundaries based on the location of the identifier and the object dimensions in a manner that is similar to tolerance definition illustrated in FIG. 8 above.

For example, the scanned identifier of a neighboring object may be located about a center of a front face of the neighboring object (as determined from a database query using the scanned identifier), and the object dimensions may specify a 12-inch length and a 12-inch width for the object. Robot 110 may determine or adjust the object center coordinates based on the current position coordinates for robot 110, and an offset between the position of the object identifier and the current position of robot 110. For instance, the center of the neighboring object may be 8 inches to the left of robot 110 and 7 inches above robot 110, and the current position of robot 110 may be defined by coordinates (X1, Y1, Z1), such that the relative center coordinate for the neighboring object is defined by coordinates (X1−8 inches, Y1+7 inches, Z1). Robot 110 may then compute the coordinates for each boundary of the object based on the center coordinates and the object dimensions.

Process 700 may include determining (at 770) if the coordinates for the computed boundaries of the neighboring object(s) overlap or conflict with the coordinates for the tolerances determined for the task execution. In response to determining (at 770—No) that the boundaries do not conflict with the task tolerances, robot 110 may safely execute (at 780) the task when remaining within the defined tolerances. In other words, robot 110 may execute the task using known imprecise movements without impacting neighboring objects.

In response to determining (at 770—Yes) that a neighboring object may obstruct the task as a result of the boundaries of the neighboring object conflicting with the task tolerances, robot 110 may preemptively correct the obstruction before attempting to perform the received task at the task destination. For instance, process 700 may include repositioning (at 785) the neighboring object that creates the obstruction so that the object is moved outside the tolerances needed for robot 110 to safely complete the task.

Process 700 may include determining (at 790) whether the corrective action was successful in removing the obstruction. If the obstruction is removed, process 700 may include executing (at 780) the original or received task. If the obstruction cannot be removed or corrected, process 700 may include generating (at 795) an alert to notify a system administrator or other party of the obstruction. Robot 110 may also abort the received task if the task cannot be safely executed as a result of the obstruction.

Figure 9:
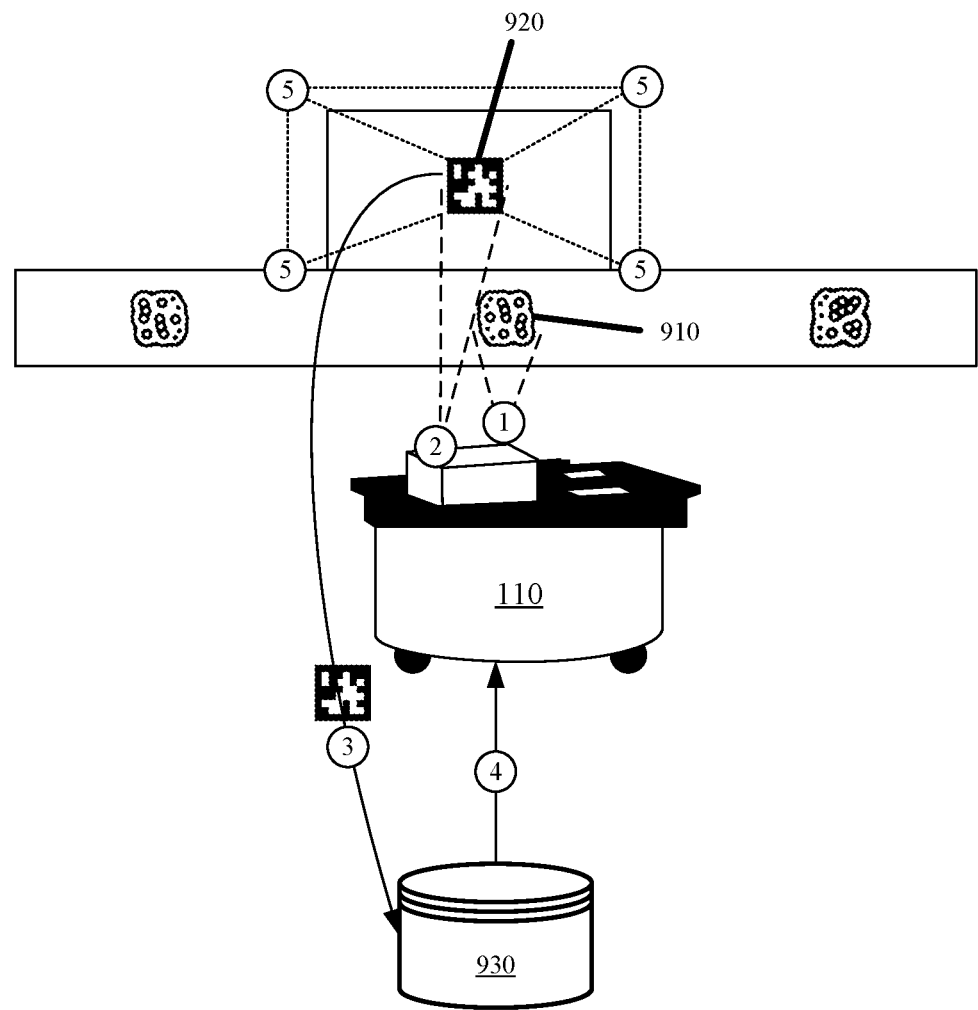
FIG. 9 conceptually illustrates a robot defining the tolerances for an assigned retrieval task based on identifiers associated with the task in accordance with some embodiments described herein.

FIG. 9 conceptually illustrates robot 110 defining the tolerances for an assigned retrieval task based on identifiers associated with the task in accordance with some embodiments described herein. As shown in FIG. 9, robot 110 may scan (at 1) first identifier 910 to confirm that robot 110 has arrived at a destination where robot 110 is to perform an assigned object retrieval task. First identifier 910 may identify an expected location of the object designated for retrieval. First identifier 910 may be part of a first set of identifiers that are distributed about one or more storage racks in a site, and may be used to identify different object storage locations of the storage racks. In some embodiments, the first set of identifiers may be distributed about the site floor or walls, and may be used to identify different locations or positions in the site.

The task object may be offset from the expected location as a result of prior interactions or imprecise operations affecting the position of the object. Accordingly, robot 110 may scan (at 2) for second identifier 920 of the object. Second identifier 920 may be part of a different second set of identifiers that are positioned on at least one surface of each stored object, and may be used to uniquely identify and/or differentiate different objects in a site.

Robot 110 may receive first identifier 910 and second identifier 920 as part of being assigned the retrieval task, and may match identifiers 910 and 920 from the assigned retrieval task to identifiers 910 and 920 found in the site to verify correct execution of the task (e.g., arriving at the correct location, and retrieving the correct object). In some embodiments, robot 110 may skip scanning for and/or identifying first identifier 910, and may instead move to the rack that stores the task object, and may scan the rack until second identifier 920 is detected.

In response to detecting (at 2) second identifier 920 of the object, robot 110 may adjust its positioning to center itself about the actual object position as identified by second identifier 920 (rather than the expected position of the object, as identified by first identifier 910). In other words, robot 110 may use first identifier 910 to arrive at or near the expected position where the retrieval task is to be executed, and may use second identifier 920 to determine the exact position where the retrieval task is to be executed by identifying the position of the object that is designated for retrieval.

Robot 110 may query (at 3) database 930 using second identifier 920. In response to the query, robot 110 may obtain (at 4) dimensions and/or other characteristics of the object from database 930. For instance, the other characteristics may provide a location of second identifier 920 about a face of the object, and the dimensions may be defined relative to the location of second identifier 920.

Robot 110 may define (at 5) the tolerances for safe retrieval of the object based on the position of second identifier 920 relative to robot 110, the dimensions of the object relative to a position of second identifier 920, and/or additional space that should be allocated as a buffer based on imprecise operations of robot 110. In this figure, second identifier 920 is about a center of the object, and the tolerances are shown to exceed the dimensions of the object.

Figure 10:
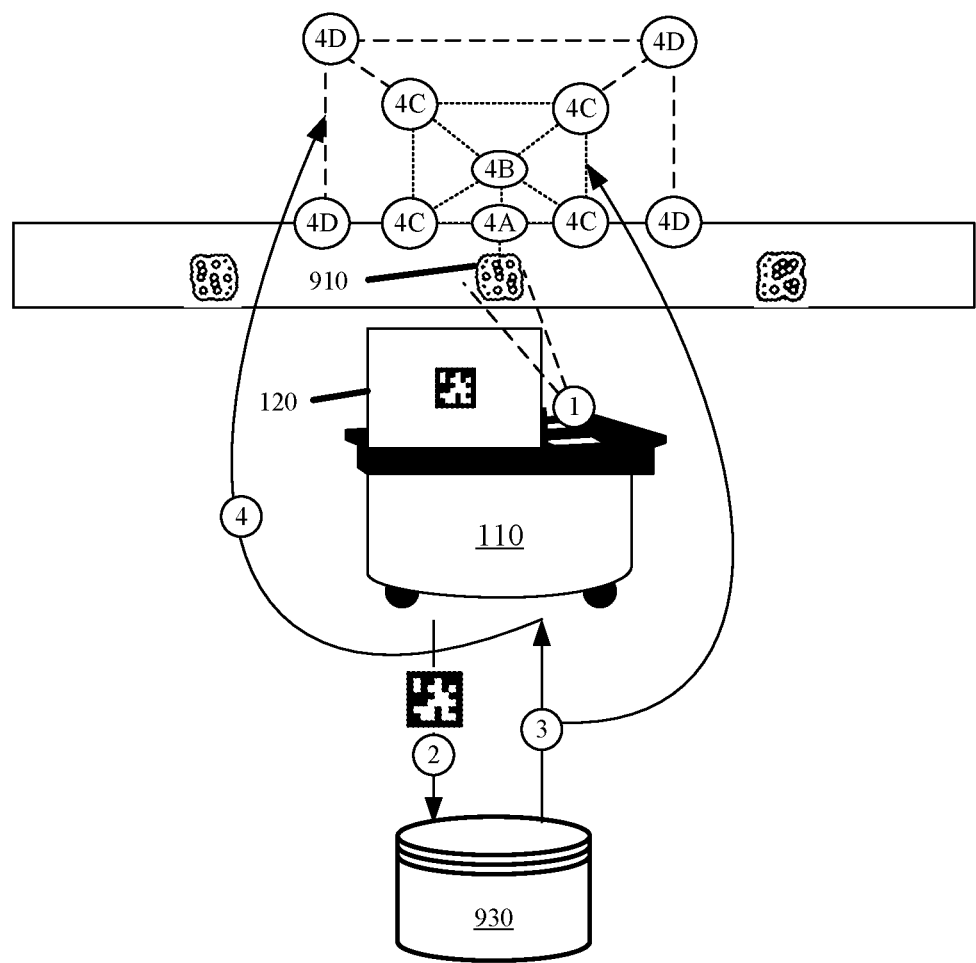
FIG. 10 conceptually illustrates a robot defining the tolerances for an assigned placement task based on identifiers associated with the task in accordance with some embodiments described herein.

FIG. 10 conceptually illustrates robot 110 defining the tolerances for an assigned placement task based on identifiers associated with the task in accordance with some embodiments described herein. Robot 110 may define the acceptable tolerances for the placement task more quickly than defining the acceptable tolerances for the retrieval task of FIG. 9, because robot 110 no longer has to account for the actual positioning of task object 120 as robot 110 is already carrying task object 120. Accordingly, robot 110 may move to the task destination, and may scan (at 1) first identifier 910 at the task destination. The scanned first identifier 910 may match to an identifier that is provided with the assigned task, thereby confirming robot 110 is at the task destination where the placement task is to be performed. Robot 110 may reposition itself before first identifier 910 so that robot 110 is a particular distance from the task destination and a particular orientation to the task destination. In some embodiments, robot 110 may avoid scanning for first identifier 910, and may instead scan the storage rack or task destination for an open space that is at least equal to the placement tolerances that are computed for task object 120

Robot 110 carries or stores task object 120 as part of the placement task. Accordingly, robot 110 may query (at 2) database 930 using second identifier 920 of task object 120. Robot 110 may obtain second identifier 920 as part of being assigned the placement task by a robot coordinator, or in response to the earlier retrieval of object 120. Database 910 may return (at 3) dimensions of task object 120 to robot 110.

Robot 110 may determine (at 4) the acceptable tolerances for the placement task based on the object dimensions, coordinates of the task destination as determined from first identifier 910, and/or known imprecisions in the operation of robot 110. For instance, robot 110 may center itself in front of first identifier 910. First identifier 910 may identify a storage space on a storage rack shelf where task object 120 is to be placed. Robot 110 obtains (at 4A) a coordinate corresponding to the center of the storage space. In some embodiments, the coordinate for the storage space may be the actual coordinates for the center of the space, and may be decoded or queried using first identifier 910. In some embodiments, the coordinate for the storage space may be a relative coordinate that is determined based on an offset from the current position of robot 110. Robot 110 may then perform (at 4B, 4C, and 4D) a set of geometric calculations to define coordinates for the tolerances that extend from the storage space center according to the object dimensions and tracked imprecisions in the operation of robot 110.

The tolerance definition portion of the prediction obstruction detection is performed efficiently and with little computational overhead using information that is readily available to robot 110. For instance, robot 110 may continually track its position in a site as it moves using Global Positioning System ("GPS") sensors, wheel encoders (e.g., that adjust positioning based on each wheel rotation), beacons, first identifier 910 being associated with a particular position, and/or other sensors of robot 110. Moreover, robot 110 may obtain the dimensions of task object 120 via a message exchange with database 930 or by retaining the dimension data in memory. Consequently, robot 110 need not perform computationally expensive image analysis to determine where to place or retrieve an object.

Figure 11:
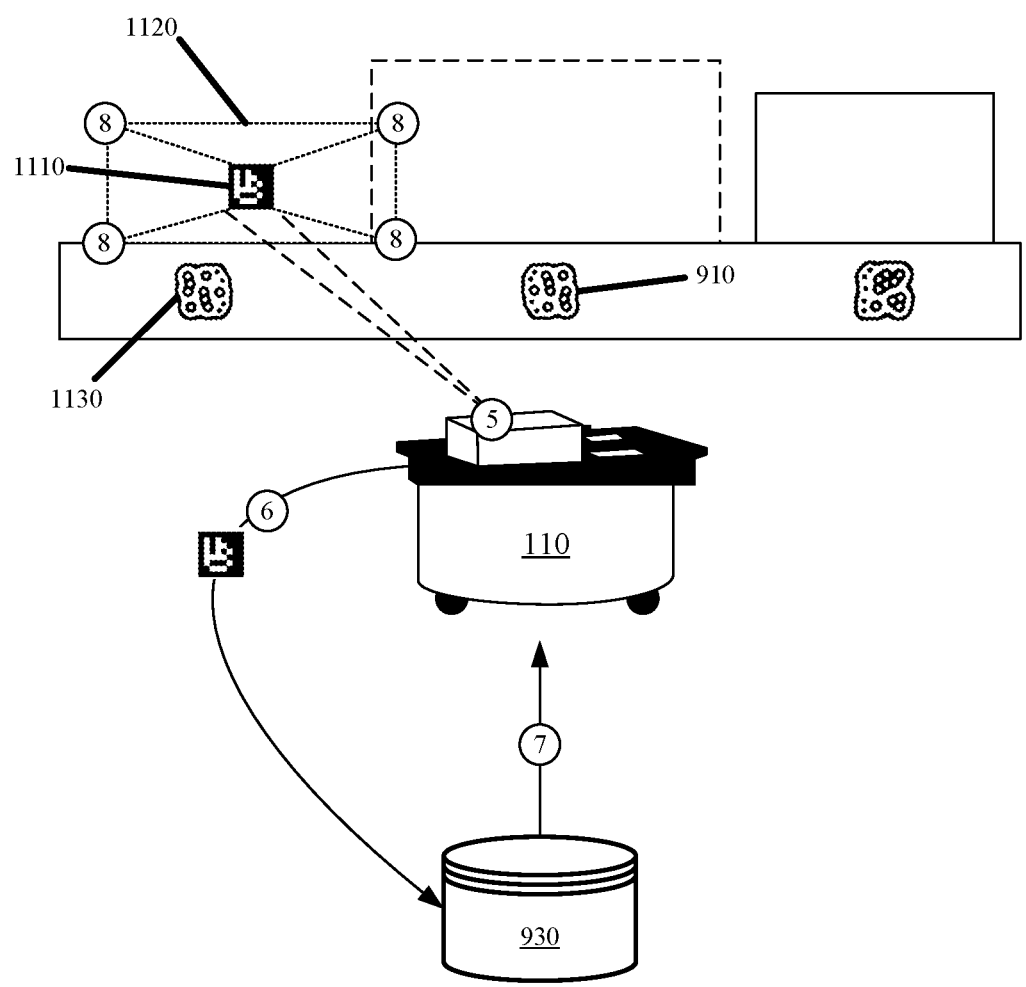
FIG. 11 conceptually illustrates robotic operations for classifying objects as obstructions in accordance with some embodiments.

The second portion of the predictive obstruction detection for determining whether neighboring objects may obstruct the task execution is similarly performed using readily available information and without computationally expensive image analysis. FIG. 11 conceptually illustrates robotic operations for classifying objects as obstructions in accordance with some embodiments.

FIG. 11 continues from the methodology presented in FIG. 10. Specifically, after defining (at 4D) the acceptable tolerances, robot 110 may perform the operations illustrated in FIG. 11 to efficiently determine, without extensive image analysis, if any objects extend into and/or violate the tolerances, thereby indicating a potential obstruction that may prevent task execution. The operations illustrated in FIG. 11 are not necessarily linked to the tolerance defining operations of FIG. 10, and may follow other methodologies or techniques for defining the acceptable tolerances of a pending task.

As shown in FIG. 11, robot 110 may remain centered about the task destination identified by first identifier 910, and may move a camera, scanner, or other identifier detecting sensor to detect (at 5) third identifier 1110. Third identifier 1110 may identify neighboring object 1120 that is closest to the task destination. In some embodiments, robot 110 may reorient or reposition itself upon identifying the task destination in order to detect third identifier 1110.

Third identifier 1110 may include a fiducial, QR code, barcode, marker, or other visual identifier that uniquely identifies neighboring object 1120. Robot 110 may query (at 6) database 930 using third identifier 1110. In response to the query, database 930 may return (at 7) dimensions, characteristics, and/or other data about neighboring object 1120 to robot 110. For instance, the characteristics may identify a position of third identifier 1110 about the outward face of neighboring object 1120, and the dimensions may be defined relative to the position of third identifier 1110.

Robot 110 may determine (at 8) the boundaries of neighboring object 1120 based on the location of third identifier 1110 on neighboring object 1120, and further based on the dimensions of neighboring object 1120. For instance, robot 110 may determine the location of third identifier 1110 (e.g., a coordinate of third identifier 1110) based on a coordinate for the current position of robot 110 and a computed distance between robot 110 and third identifier 1110. The distance may be derived based on the size, orientation, and/or appearance of third identifier 1110 in the scanning sensor of robot 110. Alternatively, the distance may be computed based on the relative position of third identifier 1110 to first identifier 910. In some embodiments, robot 110 may determine the location of third identifier 1110 by scanning fourth identifier 1130 of the shelf on which neighboring object 1120 is located, determining a location associated with fourth identifier 1130, and determining a position of third identifier 1110 relative to fourth identifier 1130 and/or first identifier 910. In any case, robot 110 may determine the position of neighboring object 1120 without visually detecting each boundary, edge, or side of neighboring object 1120.

In response to determining (at 8) the boundaries of neighboring object 1120 and defining the acceptable tolerances for the assigned task, robot 110 may then determine whether the boundary coordinates for neighboring object 1120 overlap or cross into the coordinates for the tolerances needed by robot 110 to safely execute the placement task. In this figure, an obstruction may be predictively detected based on the above determinations without robot 110 or another device visually identifying the boundaries of neighboring object 1120 and/or tolerances from computationally expensive image analysis. Moreover, the predictive detection involves detecting the obstruction without physically encountering the obstruction as a result of robot 110 commencing execution of the task.

In some embodiments, neighboring object 1120 may not have unique identifiers (e.g., third identifier 1110) by which robot 110 can readily identify neighboring object 1120, or the unique identifiers may not be easily detected. Accordingly, robot 110 may use alternative methodologies to predict whether a neighboring object creates an obstruction that falls within defined tolerances for executing a task.

Figure 12:
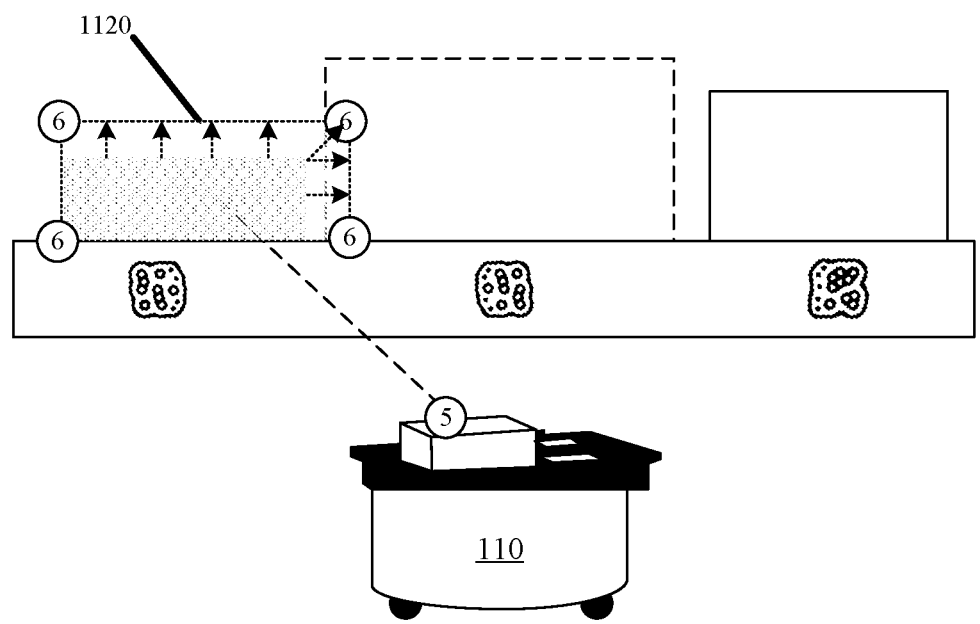
FIG. 12 illustrates predictively detecting an obstruction within defined tolerances of an assigned task using patterned light in accordance with some embodiments described herein.

FIG. 12 illustrates predictively detecting an obstruction within defined tolerances of an assigned task using patterned light in accordance with some embodiments described herein. Here again, FIG. 12 may continue from FIG. 10 and/or after having defined tolerances for a task assigned to robot 110.

In FIG. 12, the objects (e.g., neighboring object 1120) do not have unique identifiers with which robot 110 can readily differentiate one object from another. Accordingly, robot 110 may generate (at 5) a light pattern or random pattern to illuminate some portion on different surfaces of neighboring objects, and may use a depth camera or other sensor to detect the patterned light or random pattern at different distances corresponding to the surfaces of the different objects.

As shown in FIG. 12, robot 110 may determine (at 6) boundaries of neighboring object 1120 from the light pattern. In some embodiments, the light pattern may identify only a portion of the surface of object 1120, because object 1120 may be partially obscured or tilted. In some such embodiments, robot 110 may query a database to determine the full dimensions of the detected object, and robot 110 may compute the edges and boundaries of object 1120 based on the obtained dimensions and/or other information from database. The query may be based on a detected location of object 1120, or may be based on some unique feature of object 1120 that is detected using the sensors of robot 110.

Robot 110 may then determine whether the boundaries of neighboring object 1120 fall within the defined tolerances for the assigned task. In this figure, robot 110 may determine that neighboring object 1120 creates an obstruction based on the boundaries of neighboring object 1120 being within the defined tolerances for the assigned task. Accordingly, robot 110 may attempt to correct the obstruction before commencing the operations for the assigned task, may alert other robots or administrators about the obstruction, and/or may abort the task because the task cannot be executed with the obstruction.

In some embodiments, robot 110 may use other techniques and/or sensors to detect the boundaries of the neighboring objects without computationally expensive image analysis and/or without direct visual identification of the neighboring object boundaries. For instance, FIG. 13 illustrates using a depth sensor of robot 110 to detect object positioning.

Figure 13:
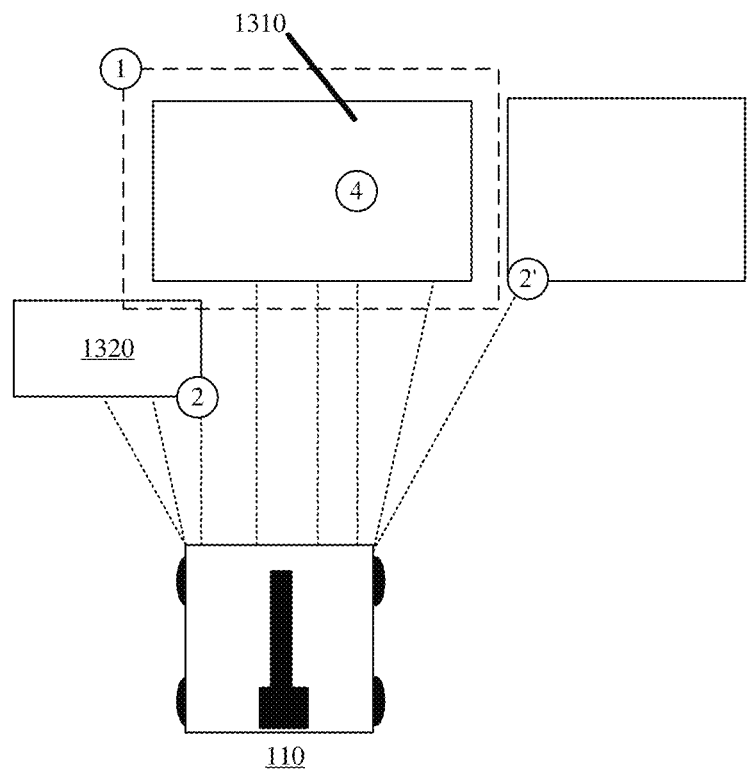
FIG. 13 illustrates using a depth sensor of a robot to detect object positioning in accordance with some embodiments.

In FIG. 13, robot 110 may determine (at 1) the tolerances for executing a task based on obtained dimensions of the task object and/or detecting the task destination where the task is to be executed. For instance, robot 110 may scan a first identifier about a storage shelf to identify a storage space corresponding to the task destination. Robot 110 may then scan a second identifier of the task object, obtain dimensions of the task object, and derive the tolerances for executing the task based on the task object dimensions and the position of the storage space.

Robot 110 may then use a depth sensor to partially detect (at 2 and 2') neighboring objects and/or to detect (at 3) task object at or near the storage space. As shown in FIG. 13, robot 110 may use the depth sensor to detect (at 3) task object 1310 at a first depth, and to detect (at 2) neighboring object 1320 at a second depth that is closer to robot 110.

Despite neighboring object 1320 partially obscuring task object 1310 from the depth sensor of robot 110, robot 110 is able to correctly determine (at 1) the tolerances needed to perform the assigned task based on the expected location for the task, and based on the obtained dimensions of the task object 1310. Accordingly, in FIG. 13, robot 110 may predictively determine that neighboring object 1320 creates an obstruction at the task destination before robot 110 commences performing the assigned task at the task destination.

In some embodiments, robot 110 may use stereo imagery (e.g., imagery from two or more cameras) to triangulate unique identifiers or feature points of different objects, or other sensors and/or techniques to detect at least one portion of a neighboring object. For instance, may use time-of-flight radar or acoustic sensors to detect at least one portion of a neighboring object.

It is important to note that portions of the neighboring objects may be obscured from the robot's sensors. However, so long as robot 110 can detect some portion of an object using one or more sensors, the methodologies described above allow robot 110 to determine the edges and boundaries of the object. For instance, robot 110 may detect a unique identifier or single point of reference in the leftmost corner of an object, and the rest of the object may be obscured by another object or may be undetectable because of the object placement.

In any case, robot 110 may query a database using the unique identifier or the single point of reference. The database may identify the position of the unique identifier or the single point of reference on the detected object, and may provide the dimensions of that object relative to the position of the unique identifier or the single point of reference. Robot 110 may then compute the edges and boundaries of the object based on the provided dimensions despite the object being partially obscured from the robot's sensors.

In other words, robot 110 does not detect the geometry of an object. Rather, robot 110 derives, computes, or models the object geometry from a single identifier or point of reference of the object. In fact, the single identifier or point of reference from the geometry of an object is computed may be located off the object itself. For instance, an identifier of a storage rack may identify the location of a particular object. By querying the database with the storage rack identifier, robot 110 may obtain the dimensions of the particular object and the position of the particular object relative to the storage rack identifier. Robot 110 may then compute the edges and boundaries of the object based on the obtained dimensions and the position of the particular object relative to the storage rack identifier.

Figure 14:
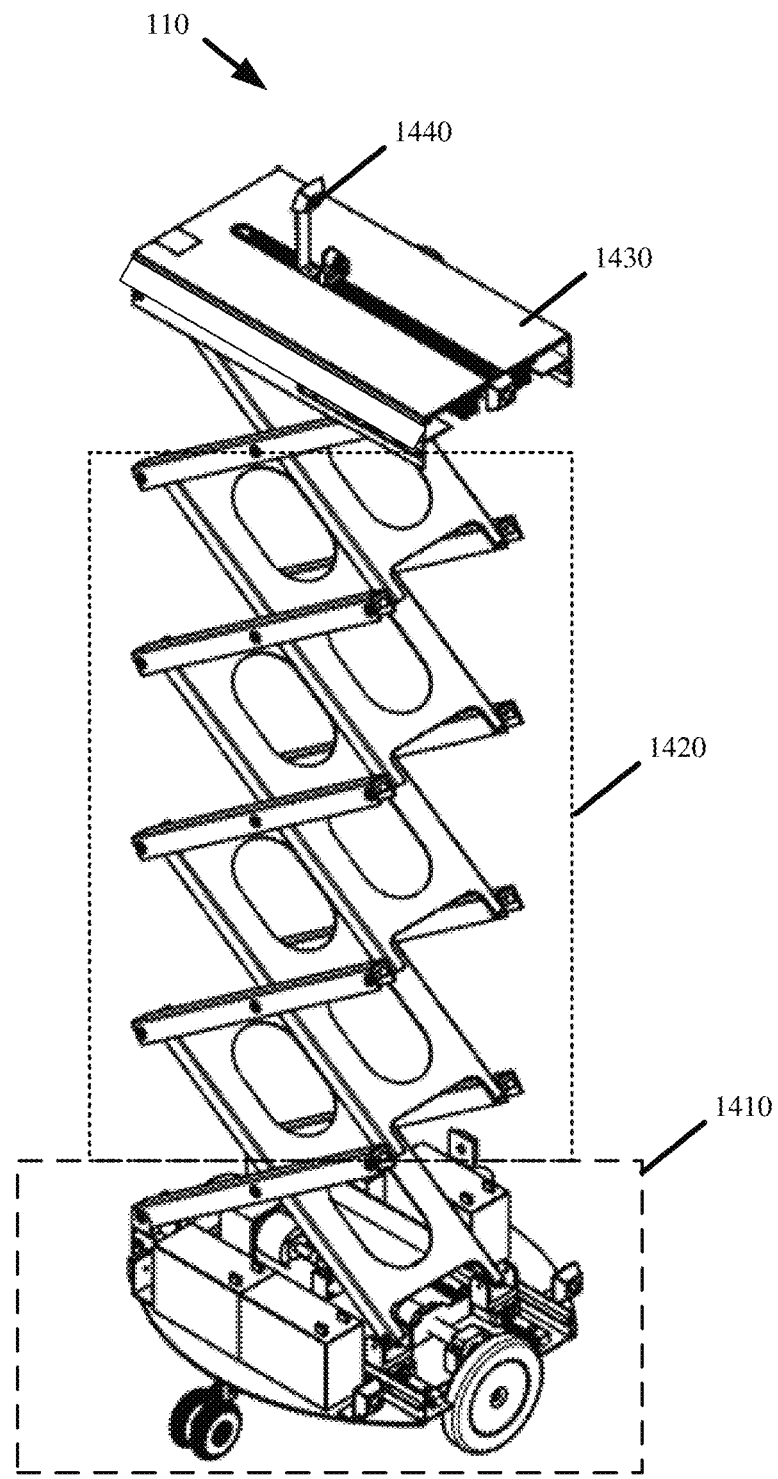
FIG. 14 illustrates some of the sensors and actuators of example an robot in accordance with some embodiments presented herein.

FIG. 14 illustrates some of the sensors and actuators of example robot 110 in accordance with some embodiments presented herein. Robot 110 may include motorized base 1410 that powers locomotion or movement of robot 110 in three-dimensional space. Motorized base 1410 may have one or more sensors and actuators including, for example, one or more drive motors, wheel encoders, gyroscopes, accelerometers, inertial sensors, scanners, LIDAR, wireless radios, and cameras. Motorized base 1410 may further include batteries, processors, wheels, and/or other components used to operate robot 110. In some embodiments, motorized base 1410 may include other actuators including articulating legs, propellers, tracks, or other means of locomotion besides the illustrated wheels.

Atop and/or attached to motorized base 1410 may be additional actuators such as lift 1420. Lift 1420 may raise and lower platform 1430. As shown, lift 1420 may include a collapsing and expanding structure. In some embodiments, lift 1420 may include a pneumatic piston or other means for raising and lowering platform 1430.

Platform 1430 may include an elongated surface onto which objects retrieved by robot 110 may be retained during transport. Platform 1430 may also include mechanical retriever 1440 with one or more actuators and/or sensors for retrieving objects onto platform 1430.

Mechanical retriever 1440 may include at least one motor or actuator for moving mechanical retriever 1440 across the surface of platform 1430 in order to engage an object and then pull the object onto platform 1430. Mechanical retriever 1440 may include one or more retrieval elements. The retrieval element may include a vacuum that uses suction to engage containers and/or other objects. The retrieval element may alternatively include a gripper, articulating mechanical arm, or other actuators to grab or otherwise engage containers and/or objects.

One or more sensors about platform 1430 or mechanical retriever 1440 may be used to determine a height of platform 1430, alignment and/or other positioning of mechanical retrieval 1440 relative to an object. The one or more sensors about platform 1430 or mechanical retriever 1440 may include cameras, patterned light emitters and detectors, scanners, readers, depth sensors (to detect distance between mechanical retriever 1440 and an object), load sensors (or weight sensors to determine force for moving an object), and/or force sensors (to detect contact with an object).

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving a task, wherein the task comprises placing or retrieving an item to or from a specified location with a robot;
computing a boundary in three-dimensional ("3D") space for safe placement or retrieval of the item to or from the specified location;
detecting a position of an object within a region that encompasses the specified location using a sensor of the robot;
comparing the position of the object against the boundary positioned on the specified location; and
stopping execution of the task by the robot in response to the position of the object intersecting at least one side of the boundary.

2. The method of claim 1, wherein detecting the position of the object comprises:
moving the robot towards the specified location; and
scanning the region that encompasses the specified location with the sensor of the robot.

3. The method of claim 1 further comprising:
generating an image of the region that encompasses the specified location based on output from the sensor of the robot;
detecting the specified location within the image;
placing the boundary on the specified location in the image; and
wherein said comparing comprises determining the position of the object in the image relative to a position of the boundary in the image.

4. The method of claim 1, wherein detecting the position of the object comprises:
illuminating the region with a pattern that is emitted from the robot; and
identifying the object based on variations in the pattern detected by the sensor.

5. The method of claim 1, wherein detecting the position of the object comprises:
measuring a first distance between the robot and the specified location using the sensor;
measuring a second distance between the robot and the object using the sensor; and
determining that the object is on a surface with the specified location based on a difference between the first distance and the second distance.

6. The method of claim 1, wherein the detecting the position of the object comprises:
emitting a signal from the sensor; and
measuring a time-of-flight or phase delay associated with the signal returning to the sensor.

7. The method of claim 1, wherein detecting the position of the object comprises:
scanning the region that encompasses the specified location with the sensor of the robot; and
identifying boundaries of the object based on a change of depth detected between the position of the object and the specified location during said scanning.

8. The method of claim 1 further comprising:
performing the task with the robot in response to the position of the object being entirely outside the boundary.

9. The method of claim 1, wherein computing the boundary comprises:
obtaining dimensions of the item; and
defining the boundary to be larger than the dimensions of the item and to include a buffer of space around the dimensions of the item.

10. The method of claim 9, wherein obtaining the dimensions of the item comprises:
scanning an identifier associated with the item using one or more sensors of the robot; and
querying a database with the identifier for the dimensions of the item.

11. The method of claim 1, wherein stopping the execution of the task comprises:
moving the object with one or more actuators of the robot until the object does not intersect the at least one side of the boundary; and
commencing the execution of the task by the robot after completing said moving.

12. The method of claim 1, wherein stopping the execution of the task comprises:
providing a notification from the robot that identifies an obstruction of the task.

13. The method of claim 1 further comprising:
measuring imprecisions based on differences between expected movements and actual movements of one or more actuators of the robot; and
sizing the boundary based on dimensions of the item and the imprecisions.

14. A robot comprising:
at least one sensor; and
one or more processors configured to:
receive a task, wherein the task comprises placing or retrieving an item to or from a specified location with the robot;
compute a boundary in three-dimensional ("3D") space for safe placement or retrieval of the item to or from the specified location;
detect a position of an object within a region that encompasses the specified location using the at least one sensor;
compare the position of the object against the boundary positioned on the specified location; and
stop execution of the task in response to the position of the object intersecting at least one side of the boundary.

15. The robot of claim 14, wherein detecting the position of the object comprises:
moving the robot towards the specified location; and
scanning the region that encompasses the specified location with the sensor of the robot.

16. The robot of claim 14, wherein the one or more processors are further configured to:
generate an image of the region that encompasses the specified location based on output from the at least one sensor;
detect the specified location within the image;
place the boundary on the specified location in the image; and
wherein said comparing comprises determining the position of the object in the image relative to a position of the boundary in the image.

17. The robot of claim 14, wherein detecting the position of the object comprises:
illuminating the region with a pattern that is emitted from the robot; and identifying the object based on variations in the pattern detected by the at least one sensor.

18. The robot of claim 14, wherein the one or more processors are further configured to:
perform the task with the robot in response to the position of the object being entirely outside the boundary.

19. The robot of claim 14, wherein stopping the execution of the task comprises:
moving the object with one or more actuators of the robot until the object does not intersect the at least one side of the boundary; and
commencing the execution of the task by the robot after completing said moving.

20. A non-transitory computer-readable medium, storing a set of processor-executable instructions, which, when executed by one or more processors, cause the one or more processors to:
receive a task, wherein the task comprises placing or retrieving an item to or from a specified location with a robot;
compute a boundary in three-dimensional ("3D") space for safe placement or retrieval of the item to or from the specified location;
detect a position of an object within a region that encompasses the specified location using a sensor of the robot;
compare the position of the object against the boundary positioned on the specified location; and
stop execution of the task by the robot in response to the position of the object intersecting at least one side of the boundary.

* * * * *